Figure 1:

F. K. McMASTER.
PISTON RING.
APPLICATION FILED JAN. 18, 1921.

1,398,439.

Patented Nov. 29, 1921.

WITNESSES.

INVENTOR.
Frederick Keith McMaster.
By his Patent Attorney.

UNITED STATES PATENT OFFICE.

FREDERICK KEITH McMASTER, OF BIRRIWA, NEAR MUDGEE, NEW SOUTH WALES, AUSTRALIA.

PISTON-RING.

1,398,439. Specification of Letters Patent. Patented Nov. 29, 1921.

Application filed January 18, 1921. Serial No. 438,153.

*To all whom it may concern:*

Be it known that I, FREDERICK KEITH McMASTER, a subject of the King of Great Britain, residing at "Durrie", Birriwa, near Mudgee, in the State of New South Wales and Commonwealth of Australia, have invented a new and useful Improvement in Piston - Rings, of which the following is a specification.

This invention relates to improvement in piston rings and more especially those for use in internal combustion engines and has been specially devised so as to produce or make a cheap lasting simple and effective gas tight joint at the meeting ends of such piston rings and which joint will minimize the excessive friction and consequent wear and tear upon the cylinder wall heretofore customary.

According to this invention a piston ring blank either eccentric or concentric is cut angularly longitudinally and angularly across the thickness of the ring so that one end is a beveled V-point and the other end a complementary beveled V-recess the sides of both of which begin at the top and bottom edges of the ring and meet on the medial line of the depth of said ring one end of said ring thus constituting the male member of a pointed beveled meeting and the other end the complementary female member thereof.

But in order that this invention may be more clearly understood and readily carried into practical effect a piston ring embodying this present improvement will now be described with reference to the drawing accompanying and forming part of this complete specification.

Figure 2:
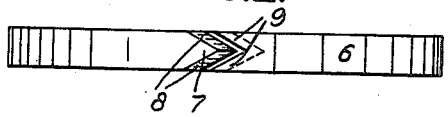
Figure 3:
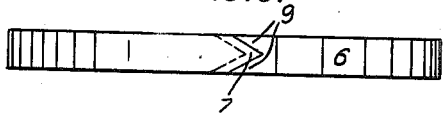
Figure 4:
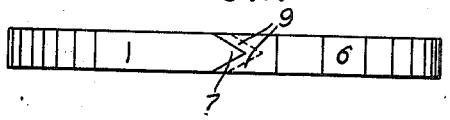
Figure 5:
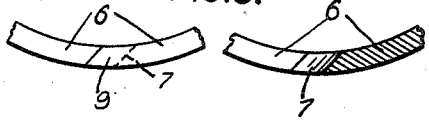

Figure 1 is an outside view of a piston ring with its ends slightly parted. Fig. 2 is a reflected inside view of Fig. 1. Fig. 3 is another outside view with the ring ends meeting. Fig. 4 is a reflected inside view of Fig. 3, and Fig. 5 shows two segments of rings one being a plan of the joint and the other a plan with one ring end shown in medial section.

The ring 6 is cut through angularly longitudinally and angularly across its thickness so that one end forms a V-shaped male member 7 with top and bottom beveled edges 8 of a pointed beveled joint while the other end of said ring 6 forms the complementary V-shaped female member 9 with inner beveled edges 10.

In use force upon the outer periphery of the ring 6 presses the end 7 into the complementary end 9 and the beveled edges 8 and 10 respectively into close contact and thus make an efficient gas tight joint. This joint on which the peripheral outer surface of the ring 6 wears will remain gas tight so long as there is resiliency in said ring and the end 7 continues to be pressed into the complementary other end 9 and further a film of lubricating oil will adhere to the beveled edges 8 and 10 and assist in maintaining the gas-tightness of the joint.

What I claim as my invention, and desire to secure by Letters Patent is:—

1. Improvement in piston rings comprising a joint wherein one of the ring ends is a beveled V-point and the other end a complementary beveled V-recess substantially as herein described and explained.

2. Improvement in piston rings comprising a joint or meeting ends made by cutting through the ring body angularly longitudinally and angularly transversely to form a beveled V-point and a complementary beveled V-recess substantially as herein described and explained.

3. Improvement in piston rings comprising a joint or meeting ends made by cutting through the ring body angularly longitudinally and angularly transversely to form a beveled V - point and a complementary beveled V recess both terminating on the medial line of the depth of said body substantially as herein described and explained.

4. A piston ring having tapered beveled V-shaped jointing or meeting ends substantially as herein described and explained and as illustrated in the drawings.

In testimony whereof I have signed my name to this specification in the presence of two subscribing witnesses.

FREDERICK KEITH McMASTER.

Witnesses:
C. BURNES,
M. SLADEN.